(12) United States Patent
Holden et al.

(10) Patent No.: US 6,539,307 B1
(45) Date of Patent: Mar. 25, 2003

(54) SYSTEM AND METHOD FOR MONITORING INTERACTION BETWEEN OBJECTS AND MULTIPLE MOBILE UNITS

(75) Inventors: Thomas P. Holden, Sunnyvale, CA (US); Jeffrey A. Hamilton, Redwood Valley, CA (US)

(73) Assignee: Trimble Navigation Ltd., Sunnyvale, CA (US)

( * ) Notice: Subject to any disclaimer, the term of this patent is extended or adjusted under 35 U.S.C. 154(b) by 0 days.

(21) Appl. No.: 09/839,333

(22) Filed: Apr. 20, 2001

(51) Int. Cl.[7] .............................. G01S 5/02; G01C 21/00
(52) U.S. Cl. .................... 701/301; 701/300; 342/357.09
(58) Field of Search ................................. 701/207, 300, 701/213, 301; 340/988, 943, 989, 992; 342/357.06, 357.08, 357.09, 357.17, 457

(56) References Cited

U.S. PATENT DOCUMENTS

| | | | |
|---|---|---|---|
| 3,718,899 A | | 2/1973 | Rollins |
| 4,651,157 A | | 3/1987 | Gray et al. |
| 4,750,197 A | | 6/1988 | Denekamp et al. |
| 4,831,539 A | * | 5/1989 | Hagenbuch .................... 177/1 |
| 4,868,886 A | | 9/1989 | Assal et al. |
| 4,963,889 A | | 10/1990 | Hatch |
| 5,014,206 A | | 5/1991 | Scribner et al. |
| 5,032,845 A | | 7/1991 | Velasco |
| 5,043,736 A | | 8/1991 | Darnell et al. |
| 5,045,861 A | | 9/1991 | Duffett-Smith |
| 5,055,851 A | | 10/1991 | Sheffer |
| 5,068,656 A | | 11/1991 | Sutherland |
| 5,148,179 A | | 9/1992 | Allison |
| 5,155,689 A | | 10/1992 | Wortham |
| 5,173,710 A | | 12/1992 | Kelley et al. |
| 5,223,844 A | | 6/1993 | Mansell et al. |
| 5,231,584 A | | 7/1993 | Nimura et al. |
| 5,243,529 A | | 9/1993 | Kashiwazaki |
| 5,262,774 A | | 11/1993 | Kuwahara et al. |
| 5,262,775 A | | 11/1993 | Tanai et al. |
| D361,569 S | | 8/1995 | Jervis |
| 5,461,390 A | * | 10/1995 | Hoshen .................... 340/573.4 |
| 5,497,149 A | * | 3/1996 | Fast ........................... 340/426 |
| 5,512,905 A | * | 4/1996 | Nichols et al. .......... 33/366.12 |
| 5,541,845 A | | 7/1996 | Klein |
| 5,751,245 A | | 5/1998 | Janky et al. |
| 5,936,573 A | * | 8/1999 | Smith .................... 342/357.08 |
| 5,957,717 A | * | 9/1999 | Monsef et al. ................. 33/293 |
| 5,991,687 A | * | 11/1999 | Hale et al. ............. 342/357.09 |

OTHER PUBLICATIONS

Rick Tetzeli, Cargo That Phones Home, Fortune Magazine, Nov. 15, 1993, 1 page.

* cited by examiner

Primary Examiner—Michael J. Zanelli
(74) Attorney, Agent, or Firm—Blakely Sokoloff Taylor & Zafman LLP

(57) ABSTRACT

A system and method for monitoring interaction between a stationary object and multiple mobile units are described. Positioning data is received from one or more mobile units. Positioning data is processed to retrieve a position of each mobile unit. Finally, one or more warning devices are activated based on a predetermined set of criteria related to the position.

41 Claims, 4 Drawing Sheets

SYSTEM AND METHOD FOR MONITORING INTERACTION BETWEEN OBJECTS AND MULTIPLE MOBILE UNITS

FIELD OF THE INVENTION

The present invention relates generally to positioning systems and, more particularly, to a system and method for monitoring interaction between objects and multiple mobile units.

BACKGROUND

One of the common problems in construction sites, for example a road construction site, is keeping track of the personnel and the equipment on the site. Large mobile construction equipment units, service trucks, smaller trucks, automobiles, and individual workers are all present in the construction area at any given time. In order to ensure the safety of the workers, the paths of the mobile vehicles need to be monitored.

For example, one such problem involves large road vehicles striking flag personnel. A flag or sign bearer may not be paying attention to the construction vehicles in the area due to the fact that he or she may be preoccupied with directing traffic involving the general public. As a result, the flag or sign bearer may be struck by the vehicle.

Nowadays, passive radar systems, video systems, sonar systems, to name a few, are being developed to prevent accidents. However, these systems are complex and hard to integrate and have not been efficiently applied to small construction sites.

SUMMARY

A system and method for monitoring interaction between objects and multiple mobile units are described. Positioning data is received from one or more mobile units. Positioning data is processed to retrieve a position of each mobile unit. Finally, one or more warning devices are activated based on a predetermined set of criteria related to the position.

Other features and advantages of the present invention will be apparent from the accompanying drawings, and from the detailed description, which follow below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A system and method for monitoring interaction between objects and multiple mobile units are described. In the following description, for purposes of explanation, numerous specific details are set forth in order to provide a thorough understanding of the present invention. It will be evident, however, to one skilled in the art that the present invention may be practiced without these specific details.

Figure 1:
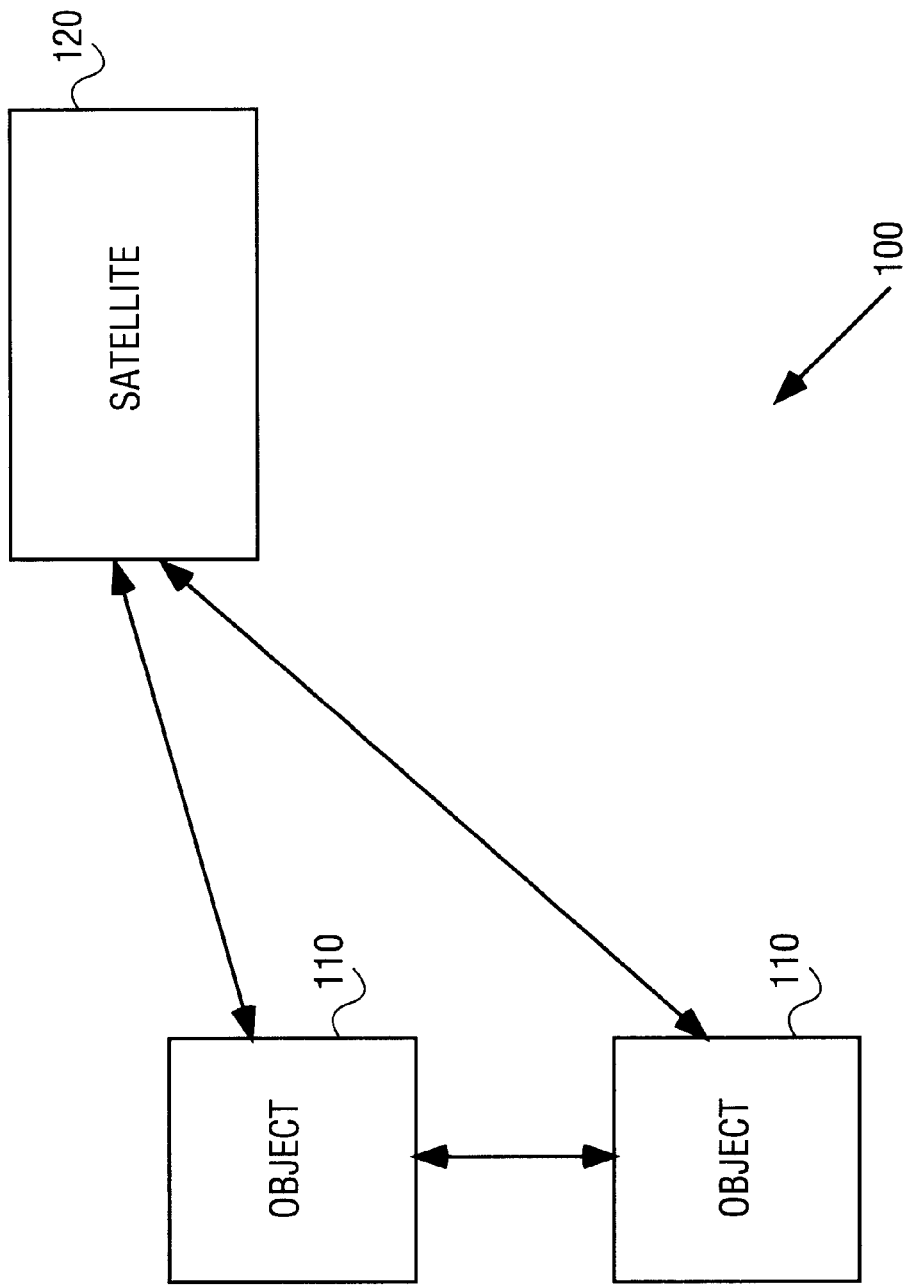
FIG. 1 is a block diagram of one embodiment for a positioning system.

FIG. 1 is a block diagram of one embodiment for a positioning system. As illustrated in FIG. 1, positioning system 100 includes objects 110 spaced apart on or adjacent to the Earth's surface. In one embodiment, the objects 110 are mobile receivers. Alternatively, objects 110 may be stationary receivers.

The objects 110 receive signals from a satellite 120, and process positioning data contained within the signals to identify the particular satellite, which is the source of the signal and to determine the time of arrival of each signal. In one embodiment, signals from at least four satellites are needed to accurately determine the present location of a corresponding object 110, as is well known in the art. At the same time, objects 110 interact with each other and exchange positioning data in order to determine proximity.

Figure 2:
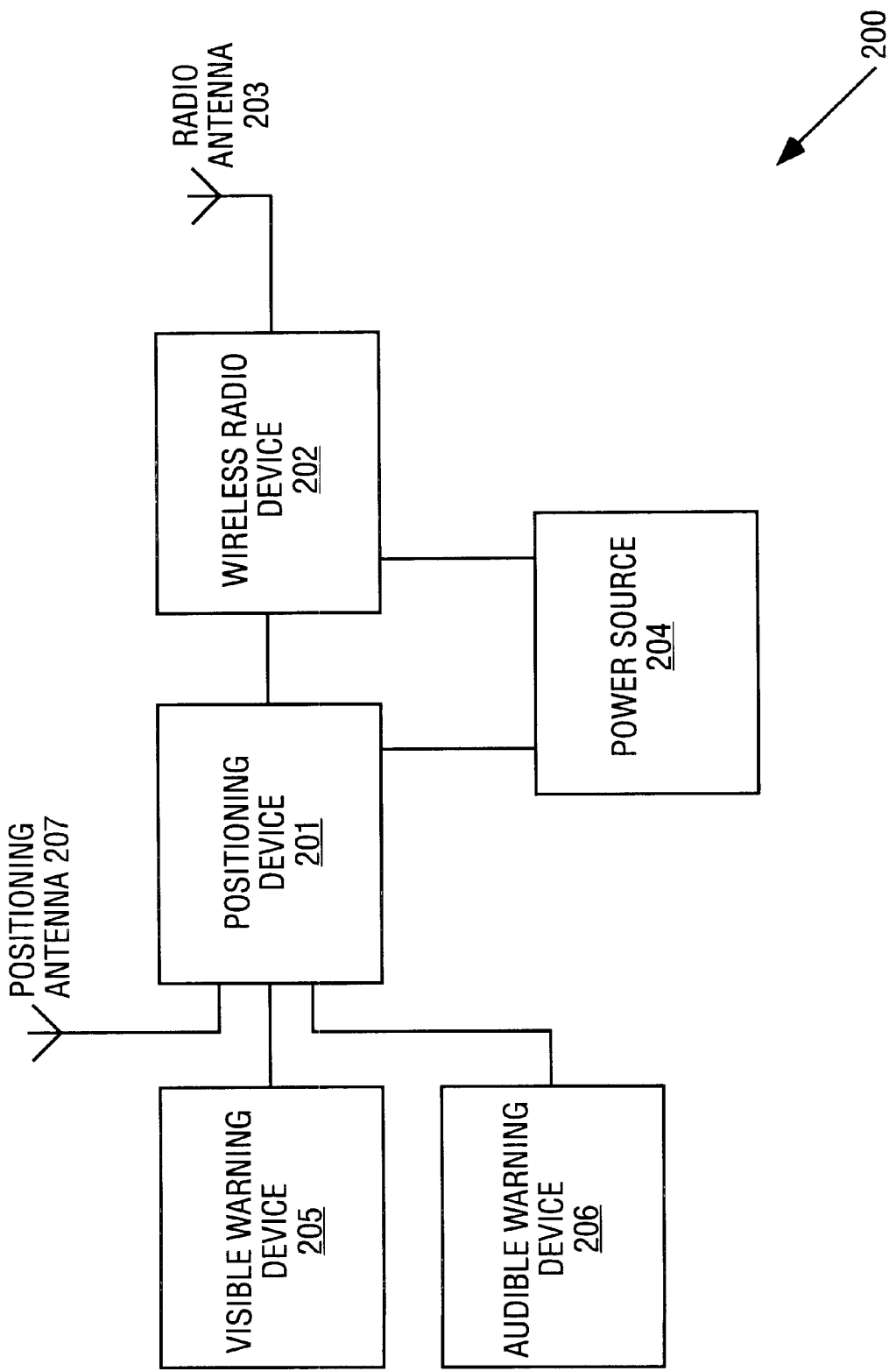
FIG. 2 is a block diagram of one embodiment for a system for monitoring interaction among objects within the positioning system.

FIG. 2 is a block diagram of one embodiment for a system for monitoring interaction among objects within the positioning system. As illustrated in FIG. 2, in one embodiment, an object 110, for example a sign unit at a construction site, attached to the ground or held by a human being, includes the system for monitoring interaction 200, which comprises a positioning device 201, for example a Global Positioning System (GPS) receiver, coupled to a positioning antenna 207, for example a GPS antenna, for receiving and processing positioning signals from several satellites, such as satellite 120 shown in FIG. 1, and for calculating reference positioning data, for example the position of the object 110.

In an alternate embodiment, system 200 may only include the positioning device 201, for example a ultrasonic positioning system or a light-based positioning system, and no positioning antenna 207.

In one embodiment, object 110 is mobile, for example a sign unit held by a moving human being or machine. Alternatively, object 110 is stationary and does not move for certain periods of time. In another alternate embodiment, object 110 is fixed, such as a sign unit attached to the ground.

In one embodiment, the positioning device 201 is further coupled to a wireless radio device 202, provided with a radio antenna 203. Alternatively, a wireless radio device 202 having positioning capabilities, for example a ultra wideband (UWB) radio receiver, is provided within system 200 in lieu of the positioning device 201 and the positioning antenna 207.

In one embodiment, the wireless radio device 202 is unidirectional and is configured to transmit the reference positioning data to other objects 110 or other mobile units, for example vehicles within the construction site. Alternatively, the wireless radio device 202 is bi-directional and is configured to transmit and receive positioning data.

In one embodiment, a power source 204, for example a battery, is coupled to the positioning device 201 and the wireless radio device 202 and provides sufficient energy to power both devices 201 and 202.

In one embodiment, system 200 further includes a visible warning device 205, for example a light emitting diode array, and an audible warning device 206, for example a speaker, coupled to the positioning device 201. Alternatively, system 200 may include either a visible warning device 205 or an audible warning device 206.

In one embodiment, positioning antenna 207 within system 200 receives multiple positioning signals from one or more satellites 120 and forwards the signals to the positioning device 201. Positioning device 201 processes the positioning signals and retrieves reference positioning data, for example GPS measurements and/or the position of the stationary object 110.

The reference positioning data is then sent to the wireless radio device 202 to be transmitted to other objects 110, for example mobile units, such as vehicles in the field. If the wireless radio device 202 is unidirectional, the reference positioning data is transmitted to the other mobile units at a fixed or variable rate through radio antenna 203.

Alternatively, if the wireless radio device 202 is bi-directional, the wireless radio device 202 may also receive different positioning data being transmitted by the mobile units, for example information about the position or status of the mobile units. The wireless radio device 202 subsequently transmits the positioning data to the positioning device 201 for processing and possible activation of the visible and/or audible warning devices 205 and 206. In one embodiment, positioning device 201 processes the positioning data and activates one or both warning devices 205 and 206 according to a predetermined set of criteria related to the position of the mobile units.

In one embodiment, positioning device 201 activates one or both of the warning devices if a range from one of the mobile units to the object 110 is within predetermined values. Alternatively, positioning device 201 may activate the devices if the distance from one of the mobile units to the object 110 is less than a predetermined value.

Figures 3A, 3B:
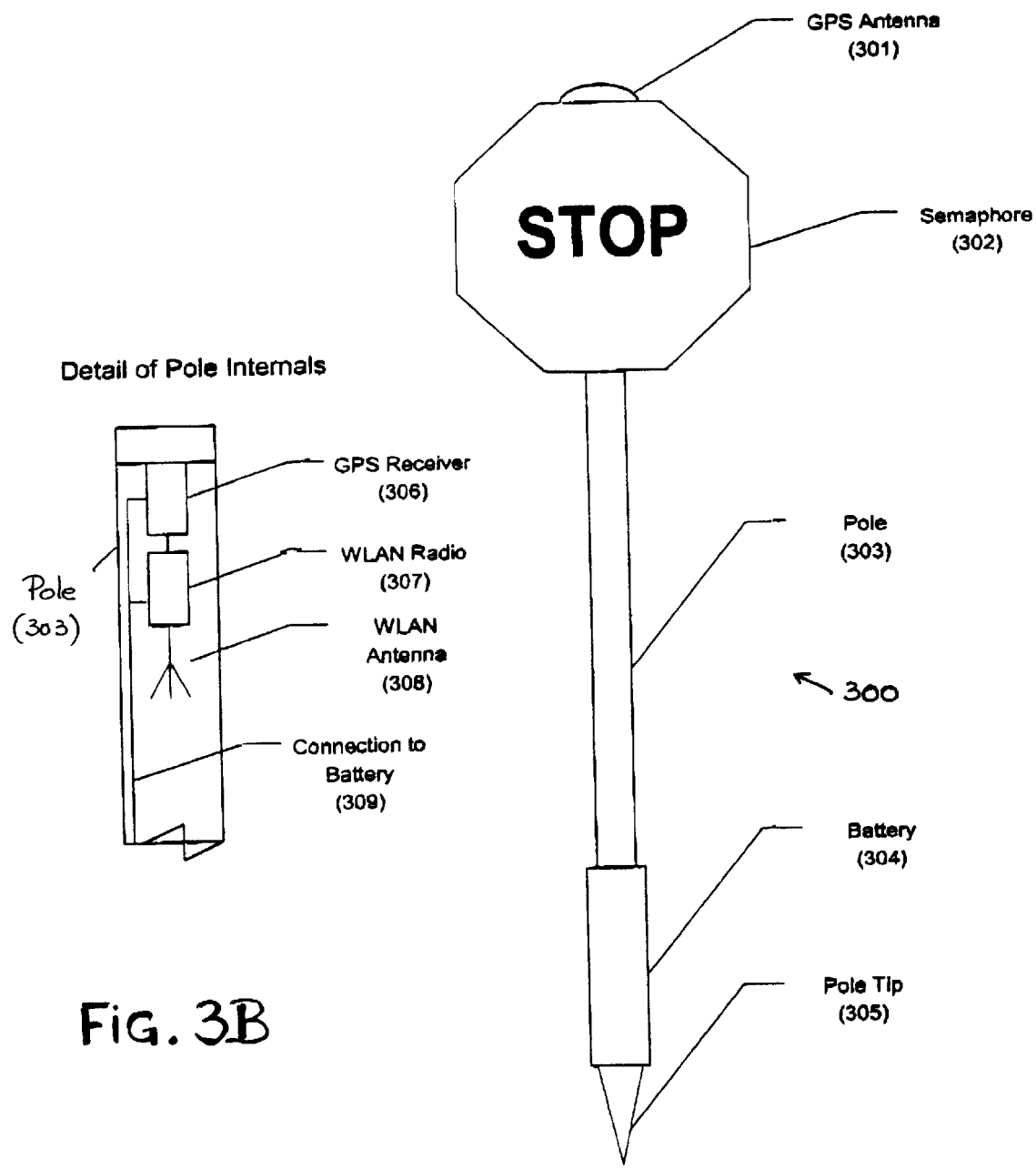
FIG. 3A illustrates one embodiment for the object within the positioning system.
FIG. 3B illustrates one embodiment detail for the object within the positioning system.

FIG. 3A illustrates one embodiment for the object within the positioning system. According to the embodiment illustrated in FIG. 3A, object 110, for example sign unit 300 includes a positioning antenna, for example GPS antenna 301, mounted on top of a pole 303 having a semaphore 302 coupled to the positioning antenna 301.

In one embodiment, a power source, for example battery 304 is coupled to the lower portion of the pole 303. Alternatively, battery 304 may be coupled to any portion of the pole 303.

In one embodiment, a tip 304 is coupled to the bottom portion of the pole 303 to allow the sign unit 300 to be attached to the ground. Alternatively, sign unit 300 may be held in a stationary position by a human being or moved from one position to another by the human being.

FIG. 3B illustrates one embodiment detail for the object within the positioning system. As illustrated in FIG. 3B, pole 303 includes a positioning device, for example GPS receiver 306 coupled to the GPS antenna 301 shown in FIG. 3A.

The GPS receiver 306 is further coupled to a wireless radio device, for example a wireless local area network (WLAN) radio 307. The WLAN radio 307 is further coupled to a radio antenna, for example WLAN antenna 308. In one embodiment, the WLAN antenna 308 is located within pole 303. Alternatively, WLAN antenna 308 may be mounted on the surface of pole 303.

In one embodiment, the GPS receiver 306 and the WLAN radio 307 are coupled to battery 304 shown in FIG. 3A via connection wire 309.

Figure 4:
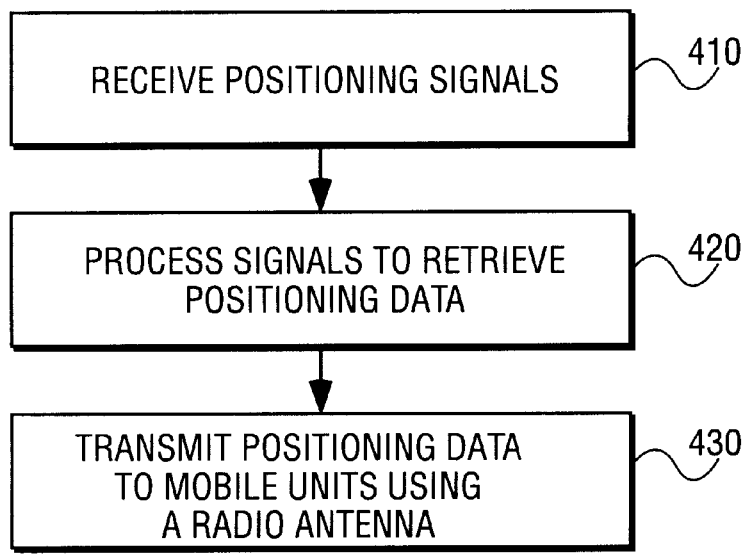
FIG. 4 is a flow diagram of one embodiment for a method for monitoring interaction between objects and mobile units within the positioning system.

FIG. 4 is a flow diagram of one embodiment for a method for monitoring interaction between objects and mobile units within the positioning system. As illustrated in FIG. 4, at processing block 410, positioning signals are received by the positioning device 201 via positioning antenna 207.

At processing block 420, positioning signals are processed by positioning device 201 to retrieve reference positioning data. Finally, at processing block 430, reference positioning data is transmitted to mobile units by wireless radio device 202 via radio antenna 203.

Figure 5:
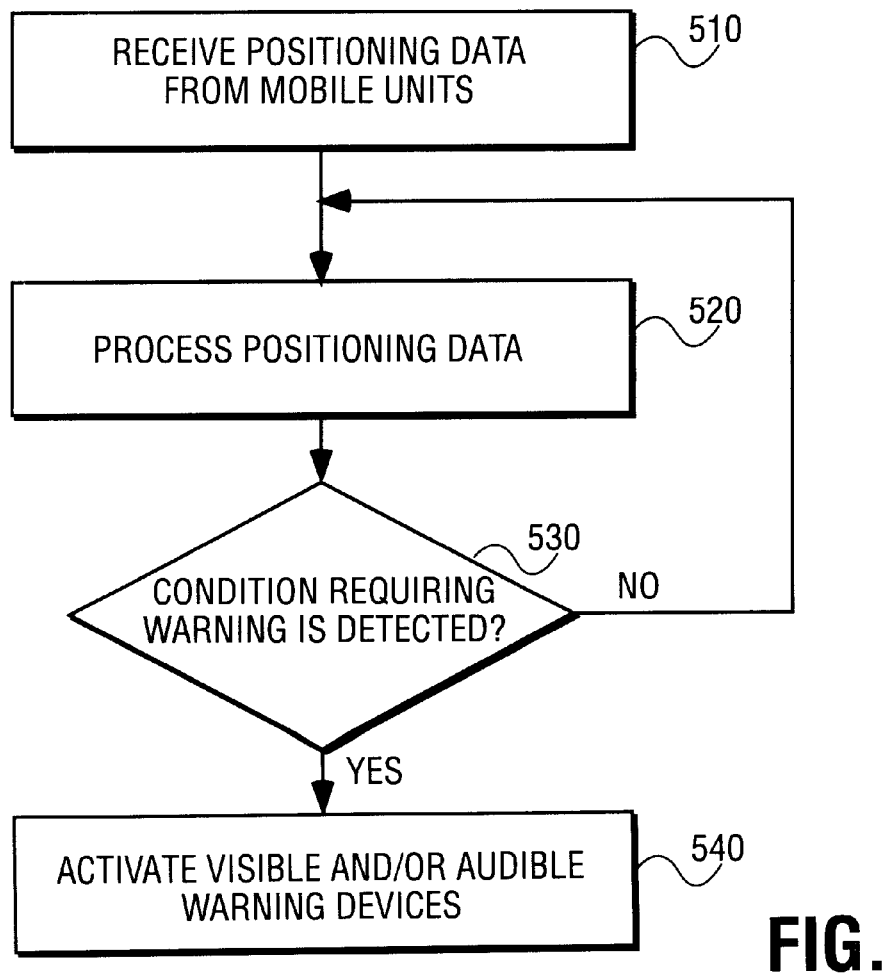
FIG. 5 is a flow diagram of an alternate embodiment for a method for monitoring interaction between objects and the mobile units within the positioning system.

FIG. 5 is a flow diagram of an alternate embodiment for a method for monitoring interaction between objects and the mobile units within the positioning system. As illustrated in FIG. 5, at processing block 510, positioning data is received from mobile units by the wireless radio device 202 via radio antenna 203.

At processing block 520, positioning data is processed by the positioning device 201 to retrieve information about the position or status of the mobile units. At processing block 530, a decision is made based on a predetermined set of criteria whether a condition requiring activation of a warning is detected from the information retrieved. In one embodiment, the condition is triggered if a range from one of the mobile units to the object 110 is within predetermined values. Alternatively, the condition is triggered if the distance from one of the mobile units to the stationary object is less than a predetermined value.

If the condition requiring activation is met, then at processing block 540, the visible and/or audible warning devices 205 and 206 are activated by the positioning device 201. Otherwise, processing blocks 520 and 530 are repeated with a new set of positioning data.

It is to be understood that embodiments of this invention may be used as or to support software programs executed upon some form of processing core (such as the CPU of a computer) or otherwise implemented or realized upon or within a machine or computer readable medium. A machine readable medium includes any mechanism for storing or transmitting information in a form readable by a machine (e.g., a computer). For example, a machine readable medium includes read-only memory (ROM); random access memory (RAM); magnetic disk storage media; optical storage media; flash memory devices; electrical, optical, acoustical or other form of propagated signals (e.g., carrier waves, infrared signals, digital signals, etc.); or any other type of media suitable for storing or transmitting information.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for monitoring at least one mobile unit, said method comprising:

receiving a plurality of positioning signals;

processing said plurality of positioning signals to retrieve reference positioning data including reference positions;

receiving positioning data from said at least one mobile unit;

processing said positioning data to retrieve a position of said at least one mobile unit;

communicating said reference positioning data to said at least one mobile unit; and activating at least one warning device based on a predetermined set of criteria related to said position and said reference positions.

2. The method according to claim 1, wherein said at least one warning device is a visual warning device.

3. The method according to claim 1, wherein said at least one warning device is an audible warning device.

4. The method according to claim 1, which comprises receiving said positioning data via a wireless local area network.

5. The method according to claim 1, wherein said at least one mobile unit is a vehicle located within a construction site.

6. The method according to claim 1, wherein said communicating further comprises communicating said reference positioning data via a wireless local area network.

7. The method according to claim 1, wherein said communicating further comprises communicating said reference positioning data at predetermined time intervals.

8. The method according to claim 1, wherein said activating further comprises activating said at least one warning device if a range from said position of said at least one mobile unit to at least one of said reference positions is within a set of predetermined values.

9. The method according to claim 1, wherein said activating further comprises activating said at least one warning device if a distance from said position of said at least one mobile unit to said reference position is shorter than a predetermined value.

10. A system for monitoring at least one mobile unit, said system comprising:
   a radio device for receiving a plurality of positioning signals, and positioning data from said at least one mobile unit; and
   a positioning device coupled to said radio device for processing said positioning data to retrieve a position of said at least one mobile unit and for processing the plurality of signals to retrieve reference position data including reference positions;
   said positioning device activating at least one warning device coupled to said positioning device based on a predetermined set of criteria related to said position and said reference positions, and wherein said radio device further communicates said reference positioning data to said at least one mobile unit.

11. The system according to claim 10, wherein said at least one warning device is a visual warning device.

12. The system according to claim 10, wherein said at least one warning device is an audible warning device.

13. The system according to claim 10, wherein said radio device further receives said positioning data via a wireless local area network.

14. The system according to claim 10, wherein said at least one mobile unit is a vehicle located within a construction site.

15. The system according to claim 10, wherein said radio device further communicates said reference positioning data via a wireless local area network.

16. The system according to claim 10, wherein said radio device further communicates said reference positioning data at predetermined time intervals.

17. The system according to claim 10, wherein said positioning device further activates said at least one warning device if a range from said position of said at least one mobile unit to at least one of said reference positions is within a set of predetermined values.

18. The system according to claim 10, wherein said positioning device further activates said at least one warning device if a distance from said position of said at least one mobile unit to at least one of said reference positions is shorter than a predetermined value.

19. The system according to claim 10, wherein said positioning device is a Global Positioning System (GPS) receiver.

20. The system according to claim 10, wherein said positioning device is an ultrasonic positioning device.

21. The system according to claim 10, wherein said positioning device is a light-based positioning device.

22. The system according to claim 10, wherein said positioning device is an ultra-wideband (UWB) radio system device.

23. A system for monitoring at least one mobile unit, said system comprising:
   a radio positioning device for receiving positioning data from said at least one mobile unit, and for processing said positioning data to retrieve a position of said at least one mobile unit and wherein said radio positioning device receives a plurality of positioning signals, processes said plurality of positioning signals to retrieve reference positioning data including reference positions, and communicates said reference positioning data to said at least one mobile unit; and
   at least one warning device coupled to said radio positioning device, said at least one warning device being activated based on a predetermined set of criteria related to said position and said reference positions.

24. The system according to claim 23, wherein said radio positioning device is an ultra-wideband (UWB) radio receiver.

25. The system according to claim 23, wherein said at least one warning device is a visual warning device.

26. The system according to claim 23, wherein said at least one warning device is an audible warning device.

27. The system according to claim 23, wherein said radio positioning device further receives said positioning data via a wireless local area network.

28. The system according to claim 23, wherein said at least one mobile unit is a vehicle located within a construction site.

29. The system according to claim 23, wherein said radio positioning device further communicates said reference positioning data via a wireless local area network.

30. The system according to claim 23, wherein said radio positioning device further communicates said reference positioning data at predetermined time intervals.

31. The system according to claim 23, wherein said radio positioning device further activates said at least one warning device if a range from said position of said at least one mobile unit to at least one of said reference positions is within a set of predetermined values.

32. The system according to claim 23, wherein said radio positioning device further activates said at least one warning device if a distance from said position of said at least one mobile unit to at least one of said reference positions is shorter than a predetermined value.

33. A computer readable medium containing executable instructions which, when executed in a processing system, cause the system to perform a method comprising:
   receiving a plurality of positioning signals;
   processing said plurality of positioning signals to retrieve reference positioning data including reference positions;
   receiving positioning data from at least one mobile unit;
   processing said positioning data to retrieve a position of said at least one mobile unit;
   communicating said reference positioning data to said at least one mobile unit; and
   activating at least one warning device based on a predetermined set of criteria related to said position and said reference positions.

34. The computer readable medium according to claim 33, wherein said at least one warning device is a visual warning device.

35. The computer readable medium according to claim 33, wherein said at least one warning device is an audible warning device.

36. The computer readable medium according to claim 33, wherein said positioning data is received via a wireless local area network.

37. The computer readable medium according to claim 33, wherein said at least one mobile unit is a vehicle located within a construction site.

38. The computer readable medium according to claim 33, wherein said communicating further comprises communicating said reference positioning data via a wireless local area network.

39. The computer readable medium according to claim 33, wherein said communicating further comprises communicating said reference positioning data at predetermined time intervals.

40. The computer readable medium according to claim 33, wherein said activating further comprises activating said at least one warning device if a range from said position of said at least one mobile unit to at least one of said reference positions is within a set of predetermined values.

41. The computer readable medium according to claim 33, wherein said activating further comprises activating said at least one warning device if a distance from said position of said at least one mobile unit to at least one of said reference positions is shorter than a predetermined value.

* * * * *